(12) United States Patent
Young et al.

(10) Patent No.: US 8,314,801 B2
(45) Date of Patent: Nov. 20, 2012

(54) VISUAL STATE MANAGER FOR CONTROL SKINNING

(75) Inventors: Kenneth L. Young, Sammamish, WA (US); Steven Charles White, Redmond, WA (US); Christian B. Schormann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 12/040,580

(22) Filed: Feb. 29, 2008

(65) Prior Publication Data

US 2009/0219294 A1 Sep. 3, 2009

(51) Int. Cl.
G06T 13/00 (2011.01)

(52) U.S. Cl. ........ 345/475; 345/473; 345/474; 345/629; 345/646

(58) Field of Classification Search .......... 345/473, 345/474, 475, 629, 646
See application file for complete search history.

(56) References Cited

U.S. PATENT DOCUMENTS

| | | | | |
|---|---|---|---|---|
| 5,652,714 | A * | 7/1997 | Peterson et al. | 702/57 |
| 5,880,729 | A | 3/1999 | Johnston, Jr. et al. | |
| 7,379,065 | B2 * | 5/2008 | Rabb, III | 345/473 |
| 7,383,515 | B2 * | 6/2008 | Bardon et al. | 715/823 |
| 7,426,691 | B2 * | 9/2008 | Novak et al. | 715/744 |
| 2002/0054086 | A1 | 5/2002 | Van Oostenbrugge et al. | |
| 2003/0231218 | A1 | 12/2003 | Amadio | |
| 2003/0234815 | A1 | 12/2003 | Delaney | |
| 2004/0017402 | A1 | 1/2004 | Bardon et al. | |
| 2004/0111673 | A1 | 6/2004 | Bowman et al. | |
| 2005/0081105 | A1 | 4/2005 | Wedel et al. | |
| 2005/0102626 | A1 | 5/2005 | Novak et al. | |
| 2006/0221081 | A1 * | 10/2006 | Cohen et al. | 345/473 |

OTHER PUBLICATIONS

Lawrence Lo, "Supporting Orthogonal Regions in Practical Large-scale Projects", Published Nov. 30, 2006.*
Wasowski, "On the Formal Semantics of VisualState Statecharts", Published Sep. 2002.*
Flex Quick Starts: Building a Simple User Interface, Retrieved online on Feb. 11, 2008, (4 pages) http://www.adobe.com/devnet/flex/quickstart/defining_state_transitions/.
Skin Making Documentation. Revision 3, Retrieved online on Feb. 11, 2008 (8 pages) http://www.crystalplayer.com/cp/skins/skinmake/.
Substance 4.1 Lima—New Features, Retrieved online on Feb. 11, 2008 (11 pages) https://substance.dev.java.net/release-info/4.1/release-info.html.

* cited by examiner

*Primary Examiner* — Kimbinh T Nguyen
(74) *Attorney, Agent, or Firm* — Workman Nydegger (57) ABSTRACT

Embodiments described herein are directed to automatically generating an animation for a transition between a current state and a new state. In one embodiment, a computer system accesses state properties of a visual element corresponding to a current state the visual element is in and a new state the visual element is to be transitioned to. The state properties include visual properties and transition description information. The computer system determines the differences between the visual properties of the current state and the new state and automatically generates an animation based on the determined differences between the visual properties for the current state and the new state, such that the animation is playable to transition the visual element from the current state to new state.

20 Claims, 5 Drawing Sheets

VISUAL STATE MANAGER FOR CONTROL SKINNING

BACKGROUND

Software applications are widely used to perform a variety of functions on computer systems. Software applications typically allow users to interact with the application using a graphical user interface (GUI). Most GUIs include different visual elements that facilitate interaction with the software application. These visual elements are often labeled to indicate the element's function in relation to the software application. Such visual elements may include buttons, scroll bars, menus, graphical objects and other means of facilitating user interaction.

Interactive GUI elements typically have multiple states. These states may include enabled, disabled, pressed or not pressed, unchecked or indeterminate. A check box, for example, may appear empty when unchecked and with a checkmark glyph when checked. Some GUIs may allow the visual elements to appear differently based on the elements' current state. For example, a button may be colored blue when pressed and white when not pressed. Many other states and possible state changes are possible. Furthermore, the GUI may allow for various transitions between states. In some cases, a user may be able to specify properties of the transition such as how long it should last, or how the visual element should appear before and after the transition.

GUIs may also allow for animations during transitions between states. Animations are a series of graphical representations that typically start at current state of a visual element (e.g. "pressed"), and animate a series of changes that take the visual element to a new state (e.g. "not pressed"). Such transition animations are typically hard-coded for each state change, and are usually specific to the type of transition being used. Furthermore, transition animations are typically rewritten each time a change is made to the visual element's state properties.

BRIEF SUMMARY

Embodiments described herein are directed to automatically generating an animation for a transition between a current state and a new state. In one embodiment, a computer system accesses state properties of a visual element corresponding to a current state the visual element is in and a new state the visual element is to be transitioned to. The state properties include visual properties and transition description information. The computer system determines the differences between the visual properties of the current state and the new state and automatically generates an animation based on the determined differences between the visual properties for the current state and the new state, such that the animation is playable to transition the visual element from the current state to new state.

In other embodiments, a computer system receives an indication that one or more state properties of a visual element are to be transitioned from a current state to a new state. The computer system accesses the currently assigned state properties for the visual element and accesses other defined state properties for the visual element, the other defined state properties including at least state properties that are to be assigned to the visual element as a result of the transition and timing properties for transitioning the visual element between different states. The computer system determines, based on the accessed currently assigned and other defined state properties, an appropriate transition timing for the visual element, automatically generates an appropriate property animation for the transition between the current state and the new state, and plays the generated animation during the transition between the current state and the new state in accordance with the transition timing.

In other embodiments, a computer system receives an indication that a visual element is to be transitioned from a current state to a new state. The transition is based on transition description information stored in state properties of the visual element. The computer system accesses the transition description information in the state properties of the visual element. The transition description information describes zero or more transitions for transitioning between the current state and the new state of the visual element. The computer system determines that the transition description information includes a specification of at least the current state, the new state or both states, weights the transitions according to which states are specified in the transition description information, and selects an appropriate transition based on the weighting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to automatically generating an animation for a transition between a current state and a new state. In one embodiment, a computer system accesses state properties of a visual element corresponding to a current state the visual element is in and a new state the visual element is to be transitioned to. The state properties include visual properties and transition description information. The computer system determines the differences between the visual properties of the current state and the new state and automatically generates an animation based on the determined differences between the visual properties for the current state and the new state, such that the animation is playable to transition the visual element from the current state to new state.

In other embodiments, a computer system receives an indication that one or more state properties of a visual element are to be transitioned from a current state to a new state. The computer system accesses the currently assigned state properties for the visual element and accesses other defined state properties for the visual element, the other defined state properties including at least state properties that are to be assigned to the visual element as a result of the transition and timing properties for transitioning the visual element between different states. The computer system determines, based on the accessed currently assigned and other defined state properties, an appropriate transition timing for the visual element, automatically generates an appropriate property animation for the transition between the current state and the new state, and plays the generated animation during the transition between the current state and the new state in accordance with the transition timing.

In other embodiments, a computer system receives an indication that a visual element is to be transitioned from a current state to a new state. The transition is based on transition description information stored in state properties of the visual element. The computer system accesses the transition description information in the state properties of the visual element. The transition description information describes zero or more transitions for transitioning between the current state and the new state of the visual element. The computer system determines that the transition description information includes a specification of at least the current state, the new state or both states, weights the transitions according to which states are specified in the transition description information, and selects an appropriate transition based on the weighting.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
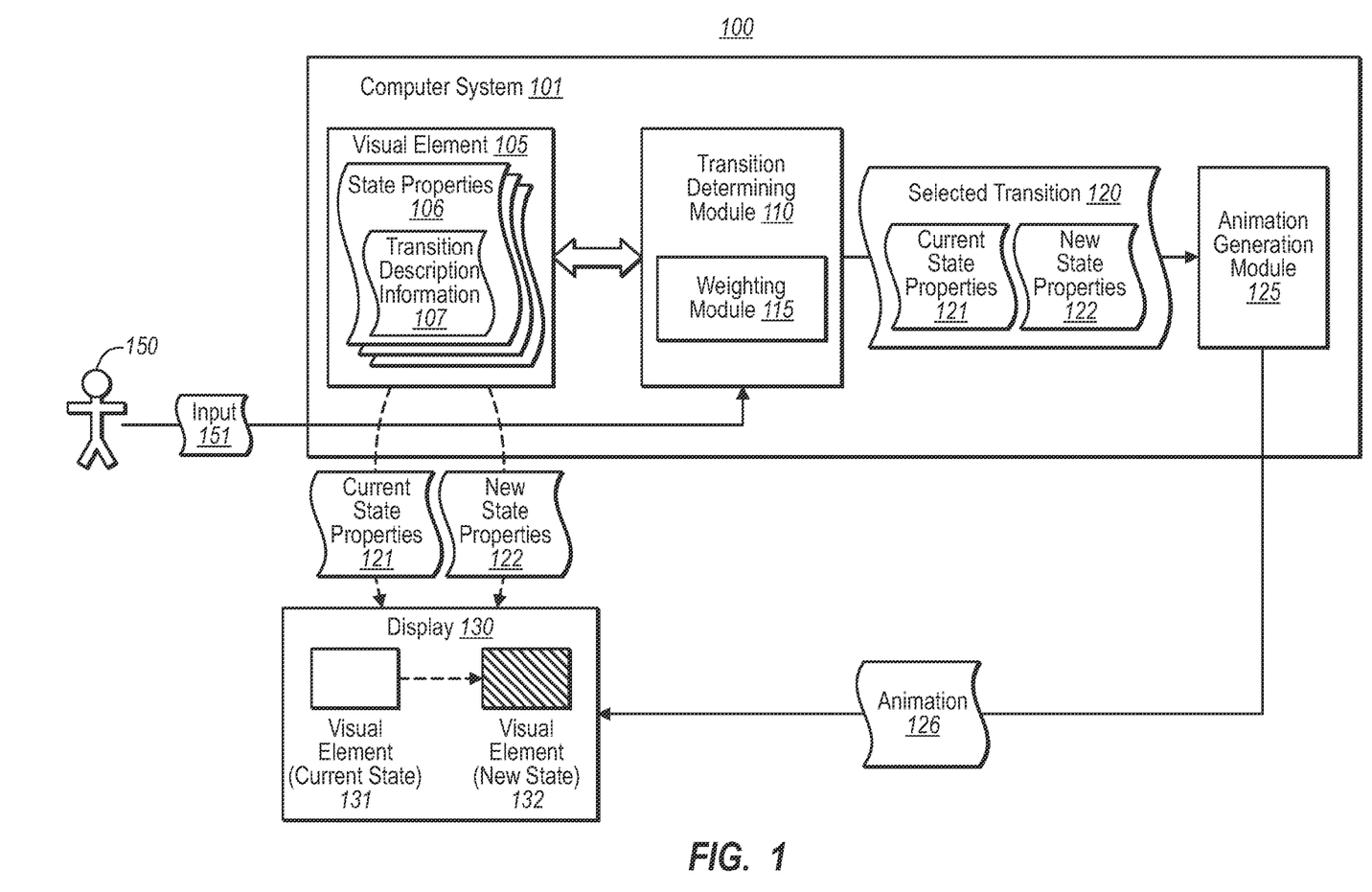
FIG. 1 illustrates a computer architecture in which embodiments of the present invention may operate including automatically generating an animation for a transition between a current state and a new state.

FIG. 1 illustrates a computer architecture 100 in which the principles of the present invention may be employed. Computer architecture 100 includes computer system 101. In some embodiments, computer system 101 includes visual element 105. Visual element 105 may be any type of control, graphic, interactive button, switch, scroll bar, menu, slider, or other element which may be visually represented in a graphical user interface (GUI). Visual element 105 has state properties 106 that include transition description information 107. State properties 106 may include any characteristics, settings, reference indicators, or other properties that may be used to define or describe visual element 105 or the appearance of element 105. State properties may be adjustable, dynamic, and fully customizable by a user. State properties 106 may include properties for a variety of different states, including a current state and a new state (e.g. properties 121 and 122, respectively). Transition description information 107 may include information describing settings or characteristics associated with a transition between different property states.

For example, a visual element such as a check box may include multiple states such as enabled or disabled, pressed or not pressed, checked, unchecked or indeterminate. Other visual elements may include a variety of states, depending on different inputs, settings, or other variables. Each state may have its own set of properties. For example, a check box in the "pressed" state may have certain characteristics such as light color scheme with dark text. The same check box may have a dark color scheme with light text when in the "not pressed" state. Additionally or alternatively, the check box may be grayed out when the check box is in the "disabled" state. A transition, as used herein, refers to a change from one state to another. Thus, in the example above, a transition would occur when the check box changes state, for example, from "pressed" to "not pressed." Many other examples of visual elements and transitions are possible, as will be explained below.

In some embodiments, transition description information 107 includes timing information indicating when, and in some cases how, the transition is to take place. For example, a transition may include an animation that animates the transition from one state to another. For instance, in the above example, an animation may fade from the dark color scheme and light text to a light color scheme and dark text. Various timing elements of the animation may be dictated in the transition description information 107.

Computer system 101 also includes transition determining module 110. Module 110 may access transition description information 107 and determine which transition is the best to use in a certain situation. For example, weighting module 115 may accord the most weight to transition information that indicates its applicability to both the visual element's current state and the visual element's new state. Weighting module 115 may accord less weight to transition information that indicates its applicability only to the visual element's new state, and still less to an indication of applicability only to the visual element's current state (i.e. the state the element is transitioning from). Such a weighting is only one of many possible weighting examples.

Transition determining module 110 may select selected transition 120 which includes current state properties 121 (i.e. for the state the element is transitioning from) and new state properties 122 (i.e. for the state the element is transitioning to). In some embodiments, current and new state properties, 121 and 122 respectively, may be sent to display 130 for displaying the visual element in the current or new states (i.e. visual element in a current state 131 and visual element in a new state 132). In one example, a transition may occur between the current state 131 and new state 132, as indicated by the arrow. In some embodiments, an animation may be played during the transition between these states. In some cases, the animation may correspond to detected differences between the current state and the new state. This will be explained in greater detail below with regard to animation generation module 125 and animation 126.

Figure 2:
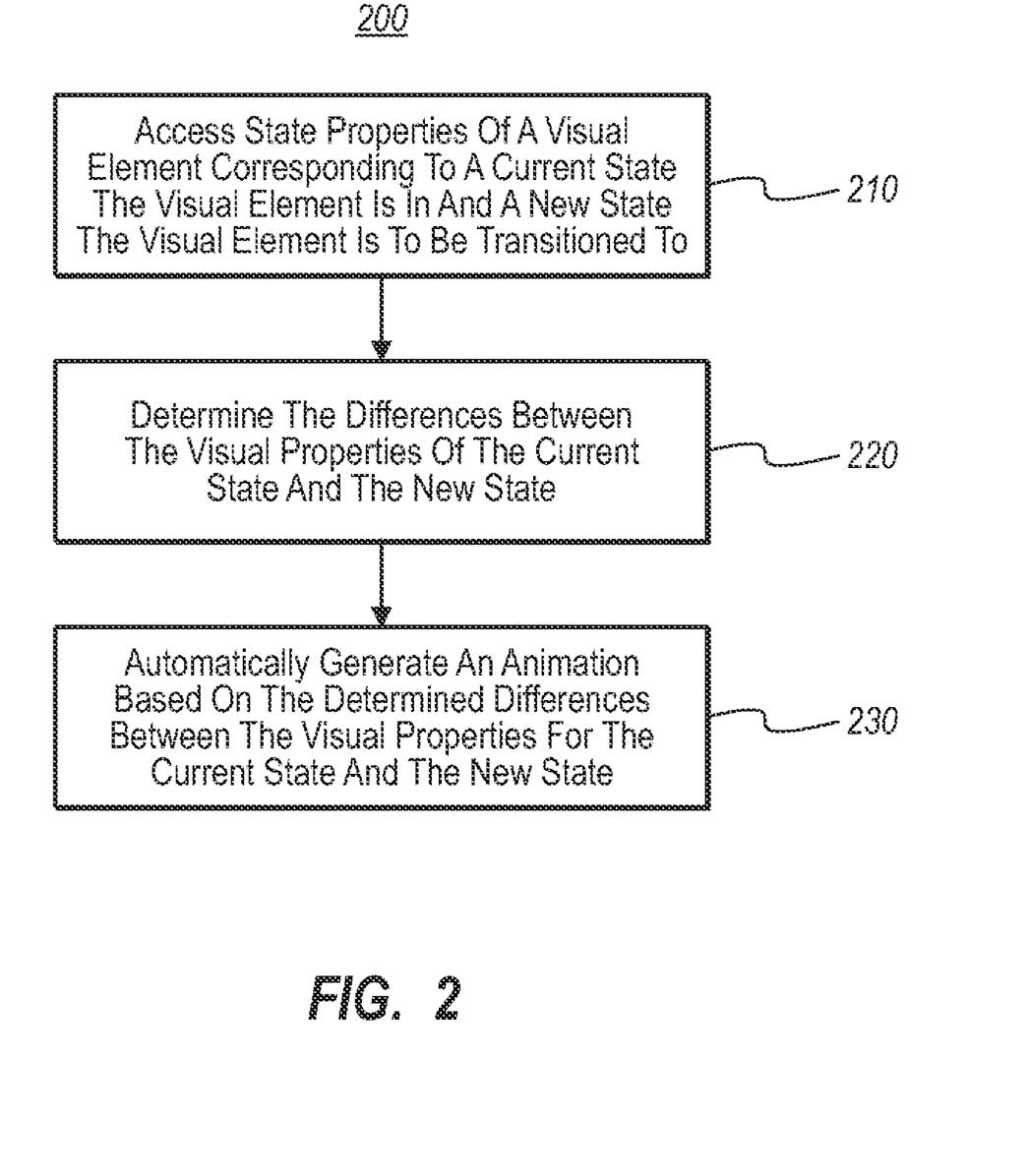
FIG. 2 illustrates a flowchart of an example method for automatically generating an animation for a transition between a current state and a new state.

FIG. 2 illustrates a flowchart of a method 200 for automatically generating an animation for a transition between a current state and a new state. The method 200 will now be described with frequent reference to the components and data of environment 100 of FIG. 1 and environment 500 of FIG. 5.

Method 200 includes an act of accessing state properties of a visual element corresponding to a current state the visual element is in and a new state the visual element is to be transitioned to, where the state properties include visual properties and transition description information (act 210). For example, animation generation module 125 may access state properties 121 and 122 of visual element 105, where properties 121 correspond to a current state that visual element 105 is in and where properties 122 correspond to a new state visual element 105 is to be transitioned to. Properties 121 and 122 may include visual properties and transition description information 107.

In some cases, visual element 105 may be a control comprising one or more customizable visual states. For example, a user may wish to design one or more visual states for a given visual element. The user may design the visual states using any type of graphic or control editor. Each state may allow configuration of different colors, shapes, sizes, designs, types, instances, insertable objects such as pictures, sounds, movies or other files, or any other customizable characteristic of the visual element. In the button example mentioned above, the user may design the button to use a light color scheme with dark text in one state, and a dark color scheme with light text in another state. As will be recognized, each visual element may have multiple different states, each being fully customizable by a user. Thus, in some embodiments, the visual element may indicate a list of all visual states that are available for customization. For instance, the visual element may include metadata, or simply information in the state properties 106, indicating to a graphical or other visual element editor, which state properties are available for customization. In some embodiments, a drop-down list may appear next to the element listing all such available customizations.

Method 200 includes an act of determining the differences between the visual properties of the current state and the new state (act 220). For example, animation generation module 125 may determine the differences between current state properties 121 and new state properties 122. For example, animation generation module 125 may determine that properties 121 and 122 have one or more similar elements such as size, shape, color scheme, and other properties. Module 125 may detect that the values for at least some of these properties are different. The differences in the values may be used in generating an animation based on those differences, as explained in relation to act 230 below.

Method 200 includes an act of automatically generating an animation based on the determined differences between the visual properties for the current state and the new state, such that the animation is playable to transition the visual element from the current state to new state (act 230). For example, animation generation module 125 may be configured to automatically generate animation 126 based on the determined differences between current state properties 121 and new state properties 122, such that animation 126 is playable to transition visual element 105 from current state 131 to new state 132. As indicated above, each state may have different properties or property values. Animation generation module 125 may be configured to analyze the differences in these values and generate an animation that effectively applies incremental changes to the visual element in its current state until the element has been transitioned to its new state.

Figure 5:
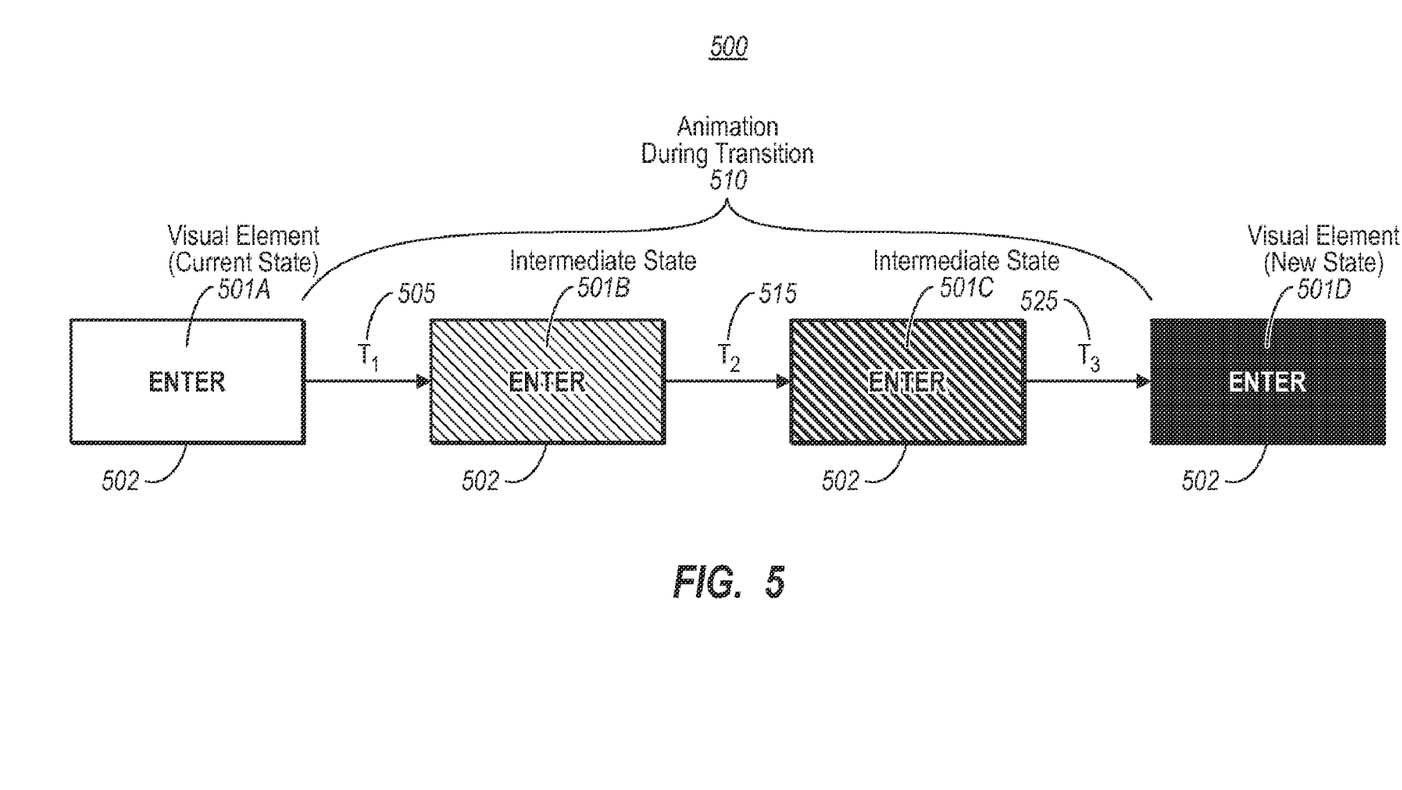
FIG. 5 illustrates an embodiment of the present invention in which an animation is played during a transition from a current state to a new state.

For example, FIG. 5 shows a very simple transition for visual element 502 from current state 501A to new state 501D, as well as an exemplary animation between state 501A and 501D. In this example, animation generation module 125 may determine that, in state 501A, the value for background color is white, and the value for text color is dark. Moreover, animation generation module 125 may determine that, in state 501D, the value for background color is black, and the value for text color is light. Using these differences in color values, animation generation module 125 may interpolate or automatically generate an animation 510 to be played during the transition between states 501A and 501D. The intermediate states for the animation (in this case, states 501B and 501C) may represent transitional values that show incremental visual changes between the current state and the new state. As will be appreciated, there can be any number of visual elements in the animation representing any number of changes. Changes may include percentage amounts. For example, new state properties may indicate the element is to be 10% larger and 40% more translucent. Animations may be played over any length of time, as defined by the user. However, the animation time may be limited by transition description information 107.

Although in the above example, only the background and text colors changed from one state to another, many other changes are possible including changes in size, shape, content, position, function or any other characteristic that may be changed on the visual element. Furthermore, the timing of each change during the animation may also be configured. For example, a user may specify that, during the animation, the color changes should take place in the first 0.2 seconds of the animation and the size changes should take place in the last 0.3 seconds. Any other timing changes or combinations including when to start, stop, delay or extend the animations are also possible and may be customized by a user. Such customization may be done for each property in the state properties. In this manner, portions of the animation may be sequenced, staggered, or otherwise arranged according to a customized timing order.

In some embodiments, transition determining module 10 may determine, based on transition description information 107, the most appropriate transition. In some cases, transition information may be specific to each state property. For instance, state properties 106 may include multiple portions of transition description information, each of which may be separately applicable. Some transition description information may be applicable only when transitioning from a given state. Other information may be applicable only when transitioning to a given state. Still other transition description information may be applicable both when transitioning to a given state and from a given state. Thus, in cases where transition description information 107 includes information applicable to both current state 121 and new state 122, weighting module 115 may give such information the greatest weight and recommend that this information be selected by module 10. Further embodiments are described below in relation to FIG. 4.

In some cases, visual element 105 may have its own animation specified in its state properties. For instance, visual element's new state may stipulate that it is to flash or pulse. Thus, computer system 101 may be configured to animate the visual element according to properties indicated in the new state. Typically, such an element animation would be initiated after playing the generated animation. In other words, the generated animation may be played to transition the visual element from the current state to new state, at which point the element's own animation may be initiated.

Figure 3:
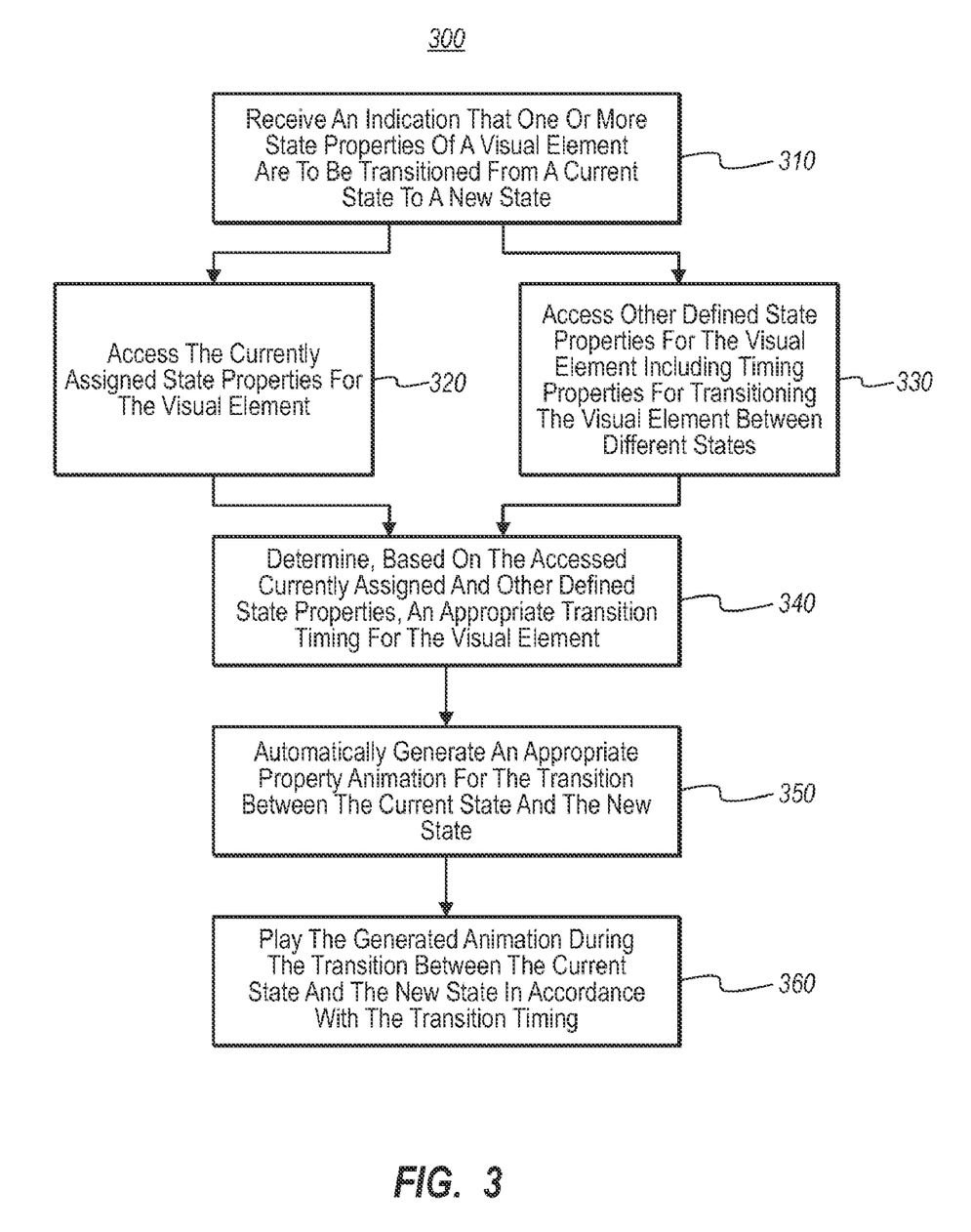
FIG. 3 illustrates a flowchart of an example method for transitioning from a current state to a new state using an automatically generated animation.

FIG. 3 illustrates a flowchart of a method 300 for transitioning from a current state to a new state using an automatically generated animation. The method 300 will now be described with frequent reference to the components and data of environment 100 of FIG. 1 and environment 500 of FIG. 5.

Method 300 includes an act of receiving an indication that one or more state properties of a visual element is to be transitioned from a current state to a new state (act 310). For example, transition determining module 110 may receive input 151 from user 150 indicating that one or more state properties 106 of visual element 105 are to be transitioned from current state 131 to new state 132. In some cases, computer system 101 may determine a category for each of element 105's states. For example, the states may be categorized into a variety of categories by type, name, description, characteristics, or by other features. In cases where states are categorized, either or both of current state 131 and new state 132 may be determined from among available states in the category. Thus, if a category includes, for example, five states, those five states would be presented as available for selection.

In some embodiments, state properties 106 may include transition description information 107 specifying one or more transition properties corresponding to either or both of a current state and a new state. As indicated above, transition description information 107 may include information indicating which transition to use depending on the "transition to" state, the "transition from" state or both. Furthermore, transition description information 107 may specify various timing instructions to be used in generating an animation. In some cases, user 150 may be able to select transition attributes from a list of attributes included in transition description information 107 that is to be applied in the generated animation.

Method 300 includes an act of accessing the currently assigned state properties for the visual element (act 320). For example, transition determining module 110 may access currently assigned state properties 106 for visual element 105. In some embodiments, state properties 106 comprises current state properties 121, as well as new state properties 122.

Method 300 includes an act of accessing other defined state properties for the visual element, the other defined state properties including at least state properties that are to be assigned to the visual element as a result of the transition and timing properties for transitioning the visual element between different states (act 330). For example, transition determining module 10 may access other defined state properties from among state properties 106. These other defined state properties may include state properties that are to be assigned to visual element 105 as a result of transition and timing properties for transitioning the visual element between current state 131 and new state 132. In some cases, the timing properties are included in transition description information 107. Computer system 101 may also be configured to enumerate each of the properties whose values are to be changed from the current state to the new state. These properties may be displayed to user 150 in a list or other form to inform the user which property values are going to be changed during the transition.

Method 300 includes an act of determining, based on the accessed currently assigned and other defined state properties, an appropriate transition timing for the visual element (act 340). For example, transition determining module 110 may determine, based on the accessed state properties, an appropriate transition timing for visual element 105. In some cases, such a determination may be made by selecting the most applicable transition from a store of available transitions. Such a store may be included in state properties 106, including transition description information 107. While the transition store may include many transitions, only some of them may be applicable to a current transition, depending on which state the element is being transitioned to and which state the element is being transitioned from. The transition most applicable to the indicated transition is selected, and from that transition, timing information is extracted to provide the basis for generating the animation.

Method 300 includes an act of automatically generating at least one appropriate property animation for the transition between the current state and the new state (act 350). For example, animation generation module 125 may be configured to automatically generate an appropriate property animation 126 for the transition between current state 131 and new state 132. Module 125 may determine which visual difference are contained in the current and new state properties, and based on those differences, produce an animation that includes visual changes that gradually shift the visual element from its current state to a new state. The visual changes may be applied in any order, or in an order specified in the element's state properties 106. The animation 126 may play as a sequence of changes that incorporate properties of the current state and the new state, and in effect, take the element from one state to the other in series of visual changes. In some cases, these changes are generated automatically without any user interaction. As mentioned above, the timing of the visual changes in the animation may be fully customized and described in transition description information 107.

Method 300 includes an act of playing at least one of the generated animations during the transition between the current state and the new state in accordance with the transition timing (act 360). For example, display 130 may play generated animation 126 during the transition between current state 131 and new state 132. It should be noted that the differences between states 131 and 132 as depicted in FIG. 1 are not limited to a difference in shading as shown in the figure. Rather, new state 132 represents visual element 105 in a state that is different than current state 131 and includes all the property differences inherent therein, depending on the contents of state properties 106.

As described in FIG. 5, animation 510 may be played during the transition from 501A to 501D. In this example, at time $T_1$ visual element 502 begins the transition to 501 D, becoming slightly darker in color, as shown in intermediate state 501B. At time $T_2$ visual element 502 continues on the transition to 501D, becoming darker in color, as shown in intermediate state 501C. At time $T_3$ the animation ends as element 502 has arrived in its new state 501D. Although only three times are shown, many more may be incorporated, both in sequence and in parallel. For example, two properties may begin to be applied at $T_1$ in parallel, one in series at $T_2$, and four more in parallel at time $T_3$. Any combination may be possible, and is only limited by the visual element's state properties (e.g. in some instances, an author of a visual element may limit which changes may be made to the element, or in what order, etc.).

Figure 4:
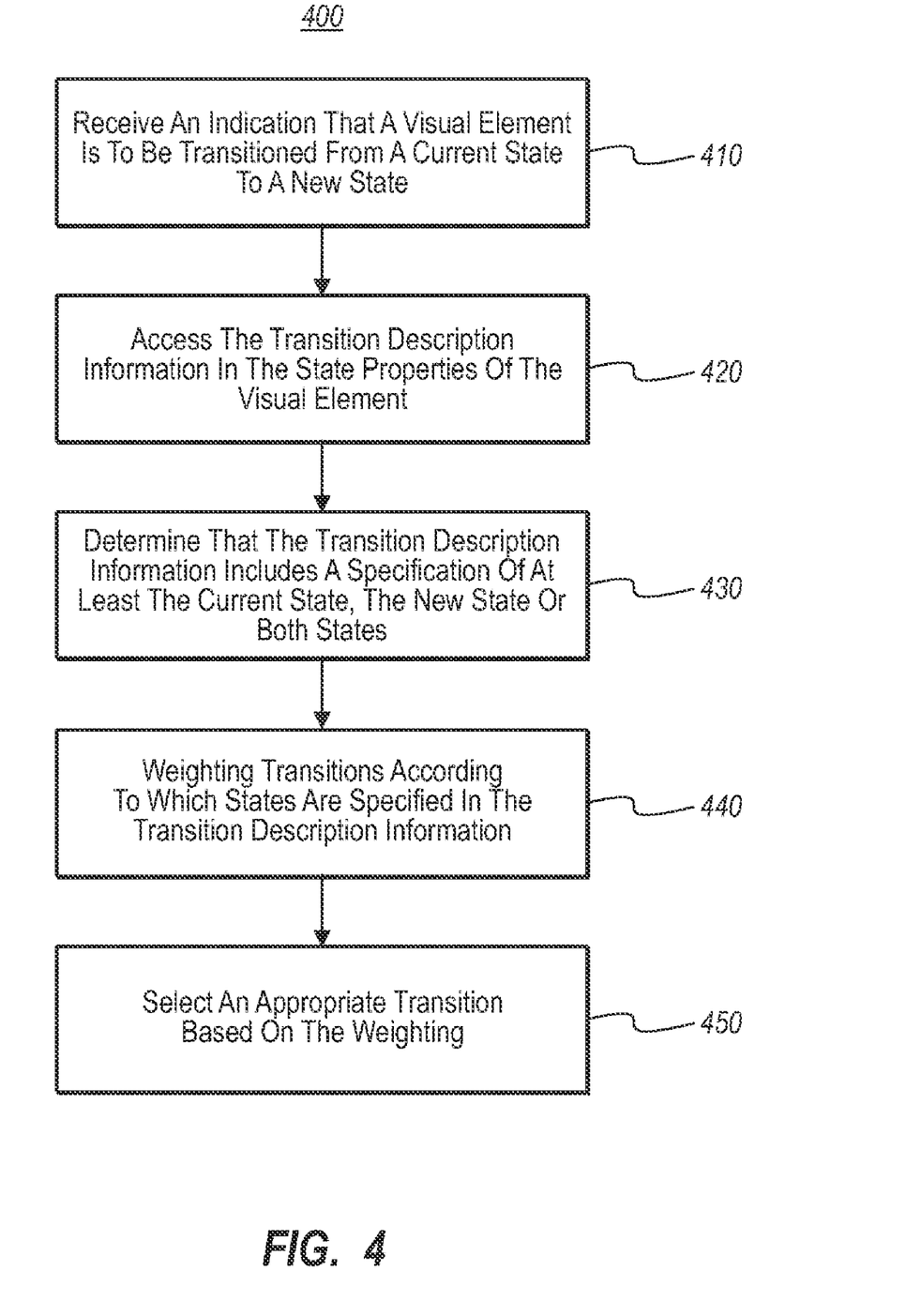
FIG. 4 illustrates a flowchart of an example method for selecting an appropriate transition for transitioning a visual element between a current state and a new state.

FIG. 4 illustrates a flowchart of a method 400 for selecting an appropriate transition for transitioning a visual element between a current state and a new state. The method 400 will now be described with frequent reference to the components and data of environment 100.

Method 400 includes an act of receiving an indication that a visual element is to be transitioned from a current state to a new state based on transition description information stored in state properties of the visual element (act 410). For example, transition determining module 110 may receive input 151 from user 150 indicating that visual element 105 is to be transitioned from current state 131 to new state 132 based on transition description information 107 stored in state properties 106. Input 151 may include an indication that user 150 has interacted with visual element 105 in some manner. For example, input 151 may indicate the user has mouse clicked on the element, or has activated a key on a keyboard that produces an interaction with the visual element. In some embodiments, the indication that visual element 105 is to be transitioned may come from another computer system, from another software program or from a computer network such as the internet.

Method 400 includes an act of accessing the transition description information in the state properties of the visual element, the transition description information describing one or more transitions for transitioning between the current state and the new state of the visual element (act 420). For example, transition determining module 110 may access transition description information 107 in state properties 106 of visual element 105. Information 107 may describe transitions for transitioning between the visual element's current state 131 and the new state 132.

Method 400 includes an act of determining that the transition description information includes a specification of at least the current state, the new state or both states (act 430). For example, transition determining module 110 may determine that transition description information 107 specifies either or both of the current state (e.g. current state properties 121) and the new state (e.g. new state properties 122). For example, a visual element author may specify which transitions to use (i.e. which transition description information to use) based on the state the element is transitioning to, the state the element is transitioning from, or both. Each may be weighted, or given precedence, according to a predetermined or user-defined scheme.

Method 400 includes an act of weighting the transitions according to which states are specified in the transition description information (act 440). For example, weighting module 115 may be configured to weight the accessed transitions according to which states are specified in transition description information 107. In some embodiments, more weight may be given to those transitions that indicate applicability to both the element's current state and the element's new state, as indicated by input 151. On a weighting scale, weighting module 115 may accord less weight to a transition that indicates applicability only to the element's new ("transition to") state. Moreover, weighting module 115 may accord still less weight to a transition that indicates applicability to only the element's current ("transition from") state. Lastly, weighting module 115 may accord no weight to a transition if it indicates applicability to neither the current state nor the new state.

Method 400 includes an act of selecting an appropriate transition based on the weighting (act 450). For example, transition determining module 110 may select an appropriate transition 120 based on the transition's weighting. In some cases, the transition with the highest weighting is selected.

In some cases, at least two of the visual element's states are orthogonal to each other and are individually and separately updatable. For example, a visual element may have states such as pressed/not pressed as well as enabled/disabled that are each separately updatable. These orthogonal states may be grouped together such that the state properties of any state in one group are updatable without affecting the state properties of any state in another group (e.g. in the above example, pressed/not pressed may be grouped in one group and enabled/disabled may be grouped in another group). In some cases, property changes defined by states in a group may be applied during the transition between states. Thus, in cases where both groups' property values have changed, both may be simultaneously updated for the same visual element.

Accordingly, as described herein, an animation for a transition between two visual states may be automatically generated based on detected differences between the states. Moreover, transitions may be selected by weighting the available transitions according to applicability based on the visual element's current state and the state to which the element is to be transitioned.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system including a processor and a memory, a method for automatically generating an animation for a transition between a current state and a new state, the method comprising:
    an act of accessing state properties of a visual element corresponding to a current state the visual element is in and a new state the visual element is to be transitioned to, the state properties for each of the current and new states including visual properties and transition description information, the state properties including multiple different separately applicable portions of transition description information;
    an act of the processor determining the differences between the state properties of the current state and the state properties of the new state;
    an act of determining that the selectively applicable portions of transition description information apply both to the current state and the new state, only to the new state or only to the current state;
    an act of weighting the portions of transition description information based on whether the portions of transition description information apply to both the current state and the new state, only to the new state or only to the current state; and
    an act of automatically generating an animation based on the determined differences between the state properties of the current state and the state properties of the new state and the applicable transition description information determined by the weighting, such that the animation is playable to transition the visual element from the current state to new state.

2. The method of claim 1, further comprising an act of determining, based on the transition description information, the most appropriate transition.

3. The method of claim 2, wherein the act of automatically generating an animation based on the determined differences further comprises applying one or more specific timing instructions included in the transition description information of the selected transition.

4. The method of claim 1, wherein the timing instructions are applied on a per-property basis.

5. The method of claim 1, further comprising playing the animation to transition the visual element from the current state to new state.

6. The method of claim 5, further comprising upon termination of the played animation, initiating one or more animations included in the state properties of the new state.

7. At a computer system including a processor and a memory, a method for transitioning from a current state to a new state using an automatically generated animation, the method comprising:
    an act of receiving an indication that one or more state properties of a visual element are to be transitioned from a current state to a new state;
    an act of accessing the currently assigned state properties for the visual element, the state properties including multiple different separately applicable portions of transition description information;
    an act of accessing other defined state properties for the visual element, the other defined state properties including at least state properties that are to be assigned to the visual element as a result of the transition and timing properties for transitioning the visual element between different states;
    an act of the processor determining, based on the accessed currently assigned and other defined state properties, an appropriate transition timing for the visual element;
    an act of determining that the selectively applicable portions of transition description information apply both to the current state and the new state, only to the new state or only to the current state;
    an act of weighting the portions of transition description information based on whether the portions of transition description information apply to both the current state and the new state, only to the new state or only to the current state;
    an act of automatically generating at least one appropriate property animation for the transition between the current state and the new state that implements the determined appropriate transition timing, wherein the animation is generated based on the applicable transition description information determined by the weighting; and
    an act of playing at least one of the generated animations during the transition between the current state and the new state in accordance with the transition timing.

8. The method of claim 7, further comprising an act of determining a category for each state.

9. The method of claim 8, wherein the current state is determined from among available states in the category.

10. The method of claim 7, further comprising an act of enumerating each of the properties that are to change from a current state to a new state.

11. The method of claim 7, wherein determining an appropriate transition for the visual element comprises selecting the most applicable transition from a store of available transitions.

12. The method of claim 7, wherein the visual element comprises one or more customizable visual states.

13. The method of claim 12, wherein the visual element indicates a list of all visual states that are available for customization.

14. The method of claim 7, wherein the state properties include transition description information specifying one or more transition properties corresponding to at least one of the current state and the new state.

15. The method of claim 14, wherein a user selects one or more transition attributes from a list of attributes included in the transition information that is to be applied in the generated animation.

16. At a computer system including a processor and a memory, a method for selecting an appropriate transition for transitioning a visual element between a current state and a new state, the method comprising:
    an act of receiving an indication that a visual element is to be transitioned from a current state to a new state based on transition description information stored in state properties of the visual element;
    an act of accessing the transition description information in the state properties of the visual element, the transition description information describing one or more transitions for transitioning between the current state and the new state of the visual element;
    an act of the processor determining that the transition description information includes a specification of at least the current state, the new state or both states, wherein one or more portions of the transition description information are separately applicable;

an act of weighting the transitions according to whether the portions of transition description information apply both to the current state and the new state, only to the new state or only to the current state; and an act of selecting an appropriate transition based on the weighting.

17. The method of claim 16, wherein the appropriate transaction selected is the highest weighted transition according to the weighting.

18. The method of claim 16, wherein at least two of the visual element's states are orthogonal to each other and are individually and separately updatable.

19. The method of claim 18, further comprising an act of grouping the orthogonal states of the visual element, such that the properties defined by states in the group are updatable without affecting the properties defined by states in another state group of the visual element.

20. The method of claim 19, further comprising an act of applying property changes defined by states in the group of orthogonal states during the transition.

* * * * *